UNITED STATES PATENT OFFICE.

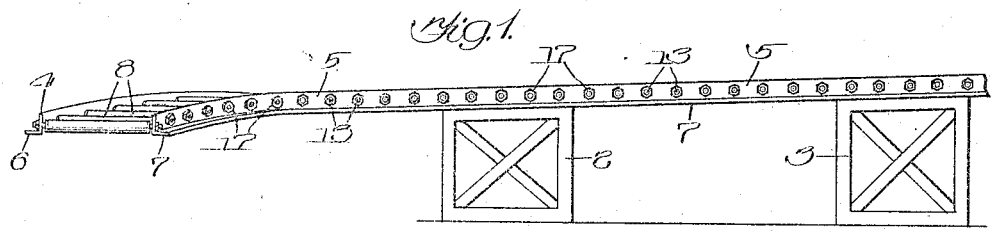
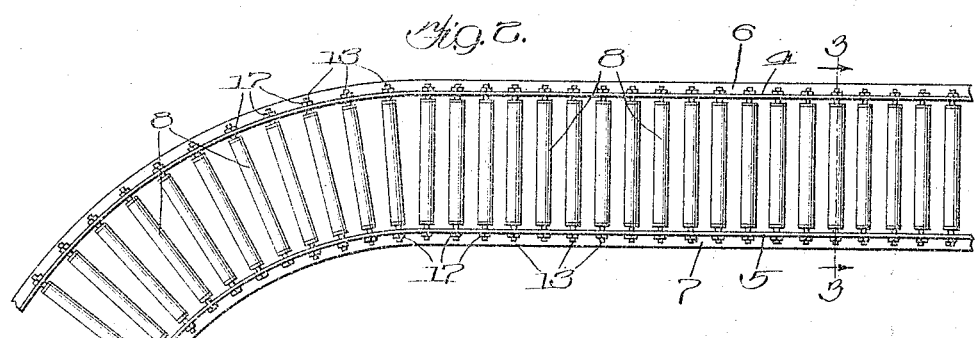
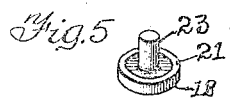
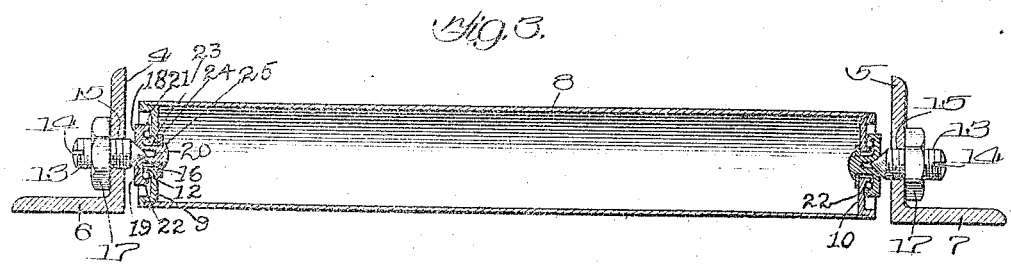
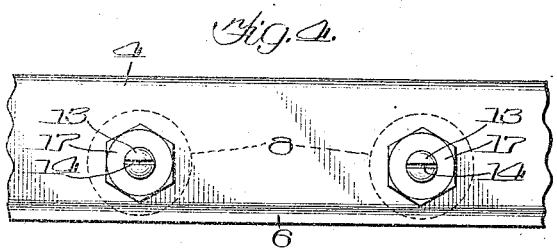

ARTHUR V. HOEFFLEUR, OF CHICAGO, ILLINOIS.

GRAVITY-CONVEYER.

1,211,154.   Specification of Letters Patent.   Patented Jan. 2, 1917.

Application filed February 5, 1915.  Serial No. 6,212.

*To all whom it may concern:*

Be it known that I, ARTHUR V. HOEFFLEUR, a citizen of the United States, residing in Chicago, county of Cook, and State of Illinois, have invented certain new and useful Improvements in Gravity-Conveyers, of which the following is a specification.

My invention relates to conveyers and particularly to gravity conveyers consisting of a series of rollers over which the packages are conveyed from one point to another by force of gravity, the conveyer being sufficiently inclined for that purpose. As these conveyers are, as in breweries, used to convey packages from point to point on the same floor level it is desirable to accomplish their function with a minimum of inclination. This necessitates the use of bearings for the rollers that produce as little friction as possible. The trunnions or journals for the rollers are for this purpose usually provided with ball or similar bearings.

The object of the present invention is to reduce the expense of constructing this class of conveyers and to simplify the mounting and adjustment of the rollers. To this end I have provided adjustable point or needle bearings in combination with an angle iron frame and a simple and novel combination for adjusting and locking the bearings in said frame. To further reduce friction I mount the bearing for the point on ball bearings, thus producing a ball bearing point or needle bearing.

The invention consists in the novel construction, combination and arrangement of parts, all as hereinafter described in detail, illustrated in the accompanying drawing and incorporated in the appended claim.

In the drawing Figure 1 is a side elevation of a length or section of conveyer of the type referred to. Fig. 2 is a plan view of same. Fig. 3 is an enlarged transverse section taken substantially on line 3—3 of Fig. 2, and represents a cross section at any point through any one of the rollers. Fig. 4 is a broken away portion of one of the sides of the conveyer, enlarged. Fig. 5 is a perspective view of the bearing for the needle point bearing, this bearing member being itself rotatable on ball bearings. Fig. 6 represents one of the heads or ends of the rollers provided with a ball race.

In the several views 2 and 3 represent any suitable series of supports for the frame of the conveyer. This frame consists of angle irons the respective vertically arranged wings of which are designated as 4 and 5 while the horizontal wings are labeled 6 and 7. Between the vertical wings 4 and 5 are mounted the usual conveyer rollers 8. In the present construction these rollers are tubular, or sections of pipe provided with heads, or end closures 9 and 10, one of which is shown in perspective in Fig. 6. This disk 9 or 10 has a central bore 11 therein around the outer end of which is a flange 12 the outer periphery of which serves as a ball track or ball bearing surface. A threaded stud 13, provided with a screw driver slot 14, has threaded engagement with a bore 15 in the vertical flange of the angle iron forming a side of the conveyer. The inner end of the threaded stud is of conical form and serves as a bearing point 16 and this bearing point is held stationary by means of a lock nut 17 which is tightened against the outer face of the vertical flange 4 or 5. The point 16 is engaged with a self centering disk 18 having a conical recess 19 therein the point of which is bored out to form a recess 20. The bearing disk 18 is revolubly mounted on ball bearings for which purpose it is provided with a ball bearing flange 21 between which and the flange 12 on the disk 9 or 10 balls 22 are inserted. To prevent these balls from falling out when the bearing is to be removed for any purpose the disk 18 is provided with a stud 23 into which the recess 20 enters. As shown in Fig. 3 the stud 23 projects beyond the inner face of the disk 9 or 10 and carries a washer 24 which is held in place on the stud by upsetting the end of the latter sufficient to prevent the washer from falling off, this upsetting or riveting of the end being designated as 25. The opening 11 for this stud is made a little larger than the stud to prevent friction between the latter and the sides of the opening 11.

It will be seen that in the above described construction friction is reduced to a minimum and that the conveyer will carry packages by gravity with an almost imperceptible inclination of the conveyer, making it possible to materially extend the carrying distance within a given vertical space. Relative to the roller 8 the bearing disk 18 will revolve comparatively slow on the balls and the conical opening or recess 19 will always remain true owing to the equal distribution of wear over its surface by the rotation of the disk 18 on the point 16.

Having thus described my invention, I claim as new and desire to secure by Letters Patent—

The combination with a track roller, of an apertured support, a needle-point bearing stud adjustably threaded into said support, a rotary bearing-member engaged by the needle-point of said stud, ball bearings for said member, and means for adjusting and locking against accidental rotation said needle point bearings.

In testimony whereof I have hereunto set my hand in the presence of two subscribing witnesses.

ARTHUR V. HOEFFLEUR.

Witnesses:
CHAS. KLENNER,
CARL MUELLER.